US010810761B2

(12) United States Patent
Hattori et al.

(10) Patent No.: US 10,810,761 B2
(45) Date of Patent: Oct. 20, 2020

(54) POSITION AND ORIENTATION ESTIMATION APPARATUS, POSITION AND ORIENTATION ESTIMATION METHOD, AND PROGRAM (71) Applicant: OMRON Corporation, Kyoto-shi, Kyoto (JP)

(72) Inventors: Kosuke Hattori, Nara (JP); Yoshinori Konishi, Souraku (JP)

(73) Assignee: OMRON Corporation, Kyoto-shi (JP)

( * ) Notice: Subject to any disclaimer, the term of this patent is extended or adjusted under 35 U.S.C. 154(b) by 107 days.

(21) Appl. No.: 16/163,152

(22) Filed: Oct. 17, 2018

(65) Prior Publication Data

US 2019/0188880 A1    Jun. 20, 2019

(30) Foreign Application Priority Data

Dec. 19, 2017  (JP) ................. 2017-242810

(51) Int. Cl.
*G06T 17/00*  (2006.01)
*G06T 7/73*  (2017.01)
*B25J 9/16*  (2006.01)

(52) U.S. Cl.
CPC ............. *G06T 7/75* (2017.01); *B25J 9/1697* (2013.01); *G06T 17/00* (2013.01); *G05B 2219/40543* (2013.01); *G05B 2219/40554* (2013.01); *G06T 2200/04* (2013.01)

(58) Field of Classification Search
CPC ....... G06T 7/75; G06T 2200/04; G06T 17/00; G05B 2219/40554; G05B 2219/40543; B25J 9/1697
See application file for complete search history.

(56) References Cited

U.S. PATENT DOCUMENTS

| 2012/0121135 | A1 | 5/2012 | Kotake et al. |
| 2013/0245828 | A1 | 9/2013 | Teteno et al. |
| 2017/0106540 | A1 | 4/2017 | Watanabe et al. |

FOREIGN PATENT DOCUMENTS

| EP | 2543482 A1 | 1/2013 |
| JP | 5393318 B2 | 1/2014 |
| WO | 2011/013301 A1 | 5/2019 |

OTHER PUBLICATIONS

The extended European search report dated May 14, 2019 in a counterpart European patent application.

*Primary Examiner* — Sam Bhattacharya
(74) *Attorney, Agent, or Firm* — Metroplex IP Law Group, PLLC

(57) ABSTRACT

A three-dimensional detailed position/orientation estimation apparatus includes a first position/orientation estimation unit and a second position/orientation estimation unit that are configured to estimate three-dimensional position and orientation. The first position/orientation estimation unit optimizes six parameters (translations x, y, and z, and rotations φ, γ, and θ) using 3D data, and the second position/orientation estimation unit optimizes only three parameters (translations x and y, and rotation θ) that can be estimated with high accuracy using a 2D image, based on the result of the three-dimensional position/orientation estimation performed by the first position/orientation estimation unit using the 3D data.

14 Claims, 6 Drawing Sheets

POSITION AND ORIENTATION ESTIMATION APPARATUS, POSITION AND ORIENTATION ESTIMATION METHOD, AND PROGRAM

CROSS-REFERENCES TO RELATED APPLICATIONS

This application claims priority to Japanese Patent Application No. 2017-242810 filed Dec. 19, 2017, the entire contents of which are incorporated herein by reference.

FIELD

The disclosure relates to a position and orientation estimation apparatus configured to estimate a position and an orientation of an object, and a position and orientation estimation method and a program for estimating a position and an orientation of an object.

BACKGROUND

As robot technology advances dramatically in recent years, attempts are made to automate tasks by a robot, such as assembly and processing that up to now have been performed manually. When assembly or processing is automated by a robot, it is sometimes necessary to estimate the position and the orientation (also referred to as "position/orientation") of an object (also referred to as "workpiece" hereinafter) that is to be held (gripped) by the robot, such as a component or a product that is to be conveyed. Conventionally, in order to estimate the position/orientation of a workpiece, various methods have been proposed in which an image of the workpiece is captured with a camera and the position/orientation of the workpiece are estimated based on the obtained image (a two-dimensional image, which is also referred to as "2D image" hereinafter).

Japanese Patent 5393318 discloses a method in which, when the position/orientation of a workpiece whose three-dimensional shape is known is estimated, three-dimensional coordinate data (3D data) on the surface of the workpiece that was measured by a distance sensor and information of an image (2D image) captured by a camera are combined into one error function, six parameters (specifically, three translation parameters along the X, Y, and Z axes, and three rotation parameters about the X, Y, and Z axes) are optimized, and thereby the position/orientation of the workpiece that coincides best with the 3D data and the 2D image are estimated. Note that for convenience of the description, the three translation parameters along with the X, Y, and Z axes are respectively referred to as translation x, translation y, and translation z, and the three rotation parameters about the X, Y, and Z axes are respectively referred to as rotation $\varphi$, rotation $\gamma$, and rotation $\theta$ hereinafter.

Japanese Patent 5393318 is an example of background art.

SUMMARY

However, in general, with a 2D image, a change in the size of an object, that is, a change in the camera's depth direction, is unlikely to appear, and thus, if the position/orientation of a workpiece is estimated using its 2D image, a translation z, rotation $\varphi$, and rotation $\gamma$, which are the parameters in the camera's depth direction, have low estimation accuracy. Thus, as in Japanese Patent 5393318, the method for estimating the position/orientation of a workpiece including the camera's depth direction using its 2D image as well was problematic in that the position/orientation estimated therewith has a low estimation accuracy in the camera's depth direction.

One or more aspects have been made in view of the above-described circumstances, and it is an object thereof to provide a position and orientation estimation apparatus capable of increasing accuracy of estimating the position and the orientation of an object in the camera's depth direction, compared with a conventional technique, for example.

A position and orientation estimation apparatus according to one aspect is an estimation apparatus configured to estimate a position and an orientation of an object, the apparatus including a processor (such as a central processing unit (CPU) or application specific integrated circuit (ASIC), etc.) configured with a program to perform operations as units of the estimation apparatus, a first acquisition unit configured to acquire a two-dimensional image of the object; a second acquisition unit configured to acquire a three-dimensional model expressing a three-dimensional shape of the object; a third acquisition unit configured to acquire position/orientation information expressing pre-update position and orientation of the object that are estimated; a second position/orientation estimation unit configured to update the position/orientation information with regard to a translation in an X-axis and a translation in a Y-axis, which are two different axes on a plane of the two-dimensional image, and a rotation about the Z-axis that is orthogonal to the X-axis and the Y-axis, using the three-dimensional model and the two-dimensional image; and an output unit configured to output the position and the orientation expressed by the updated position/orientation information as the position and the orientation of the object.

With this configuration, when receiving the position/orientation information expressing the pre-update position and orientation of the object that is estimated, the second position/orientation estimation unit optimizes only the translation in the X-axis direction and the translation in the Y-axis direction (that is, translation x and translation y) that can be estimated with high accuracy using the two-dimensional image, and the rotation about the Z-axis (that is, rotation $\theta$) that is orthogonal to the X-axis and the Y-axis.

This makes it possible to prevent a problem, which is a weakness of three-dimensional position/orientation estimation using a two-dimensional image, of a conventional technique with which three parameters, namely, the position in the camera's depth direction (that is, translation z) and rotations (that is, rotation $\varphi$ and rotation $\gamma$), cannot be estimated with high accuracy, and to increase accuracy of estimating the position and the orientation of an object in the camera's depth direction, compared with a conventional technique.

The above-described configuration may also have an aspect in which the second position/orientation estimation unit includes a two-dimensional model generation unit configured to generate a two-dimensional model projected on the same plane as that of the two-dimensional image, based on the position/orientation information, an optimization unit configured to optimize a translation parameter in the X-axis, a translation parameter in the Y-axis, and a rotation parameter about the Z-axis by matching the positions of the two-dimensional image and the two-dimensional model, and an updating unit configured to update the position/orientation information using the optimized three parameters.

The above-described configuration may also have an aspect in which a fourth acquisition unit configured to acquire three-dimensional coordinate data expressing three-dimensional coordinates of a surface of the object that have been measured, and a first position/orientation estimation unit configured to update the position/orientation information through positioning using the three-dimensional model and the three-dimensional coordinate data are further included, and the first position/orientation estimation unit receives the position/orientation information acquired by the third acquisition unit, and the position/orientation information updated by the first position/orientation estimation unit is transmitted to the second position/orientation estimation unit.

The above-described configuration may also have an aspect in which a fourth acquisition unit configured to acquire three-dimensional coordinate data expressing three-dimensional coordinates of a surface of the object that have been measured, and a first position/orientation estimation unit configured to update the position/orientation information through positioning using the three-dimensional model and the three-dimensional coordinate data are further included, and the first position/orientation estimation unit receives the position/orientation information updated by the second position/orientation estimation unit, and the position/orientation information updated by the first position/orientation estimation unit is transmitted to the output unit.

The above-described configuration may also have an aspect in which a fourth acquisition unit configured to acquire three-dimensional coordinate data expressing three-dimensional coordinates of a surface of the object that have been measured, and a first position/orientation estimation unit configured to update position/orientation information through positioning using the three-dimensional model and the three-dimensional coordinate data are further included, and the position/orientation information acquired by the third acquisition unit is transmitted to the first and second position/orientation estimation units, the position/orientation information updated by the first position/orientation estimation unit and the position/orientation information updated by the second position/orientation estimation unit are transmitted to the output unit, and the output unit outputs the position and the orientation of the object based on the position/orientation information updated by the first position/orientation estimation unit and the position/orientation information updated by the second position/orientation estimation unit.

The above-described configuration may also have an aspect in which, when performing positioning, the first position/orientation estimation unit optimizes a translation parameter in the X-axis, a translation parameter in the Y-axis, a translation parameter in the Z-axis, a rotation parameter about the X-axis, a rotation parameter about the Y-axis, and a rotation parameter about the Z-axis so as to bring points of the three-dimensional model corresponding to points of the three-dimensional coordinate data closer to the corresponding points of the three-dimensional coordinate data, and updates the position/orientation information using the optimized six parameters.

The above-described configuration may also have an aspect in which, when performing positioning, the first position/orientation estimation unit optimizes a translation parameter in the Z-axis, a rotation parameter about the X-axis, and a rotation parameter about the Y-axis so as to bring points of the three-dimensional model corresponding to points of the three-dimensional coordinate data closer to the corresponding points of the three-dimensional coordinate data, and updates the position/orientation information using the optimized three parameters.

According to one or more aspects, even if both pieces of information on 3D data and a 2D image are used, the accuracy of estimating the position and the orientation of a workpiece using both pieces of information on the 3D data and the 2D image can be increased, compared to a conventional technique.

DETAILED DESCRIPTION

Hereinafter, an embodiment will be described with reference to the drawings.

A. Embodiment

A-1. Application Example

Figure 1:
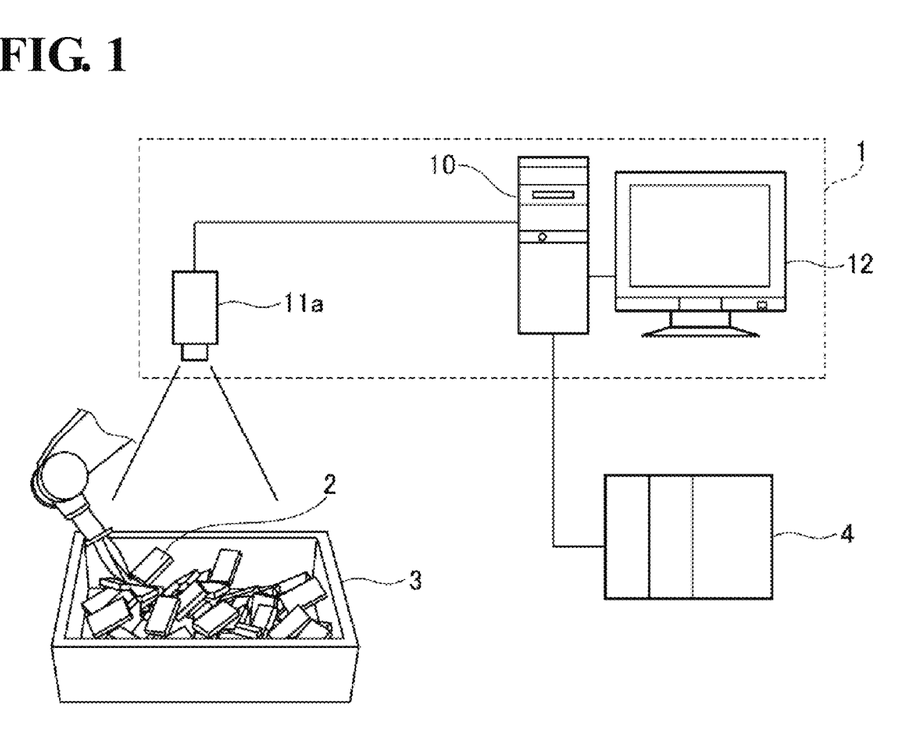
FIG. 1 is a diagram illustrating the overall configuration of an object recognition apparatus.

An example of a scene to which an embodiment is applied will be described with reference to FIG. 1.

An object recognition apparatus 1 is a system that is installed in a production line provided with a picking system, and is configured to recognize the position and the orientation of an object 2 (three-dimensional object recognition) on a tray 3 through template matching using an image captured from a camera 11a. Objects to be recognized (that is, workpieces) 2 are stacked in bulk on the tray 3. The object recognition apparatus 1 captures an image from the camera 11a at predetermined time intervals, executes processing for recognizing the position and the orientation of each workpiece 2 included in the image using the image processing apparatus 10, and outputs its result to a PLC (programmable logic controller) 4 or a display 12, for example. The recognition result, which is the output from the object recognition apparatus 1, is utilized to control a picking robot, control a processing apparatus or a printing apparatus, examine or measure the workpieces 2, for example.

A-2. Hardware Configuration

Figure 2:
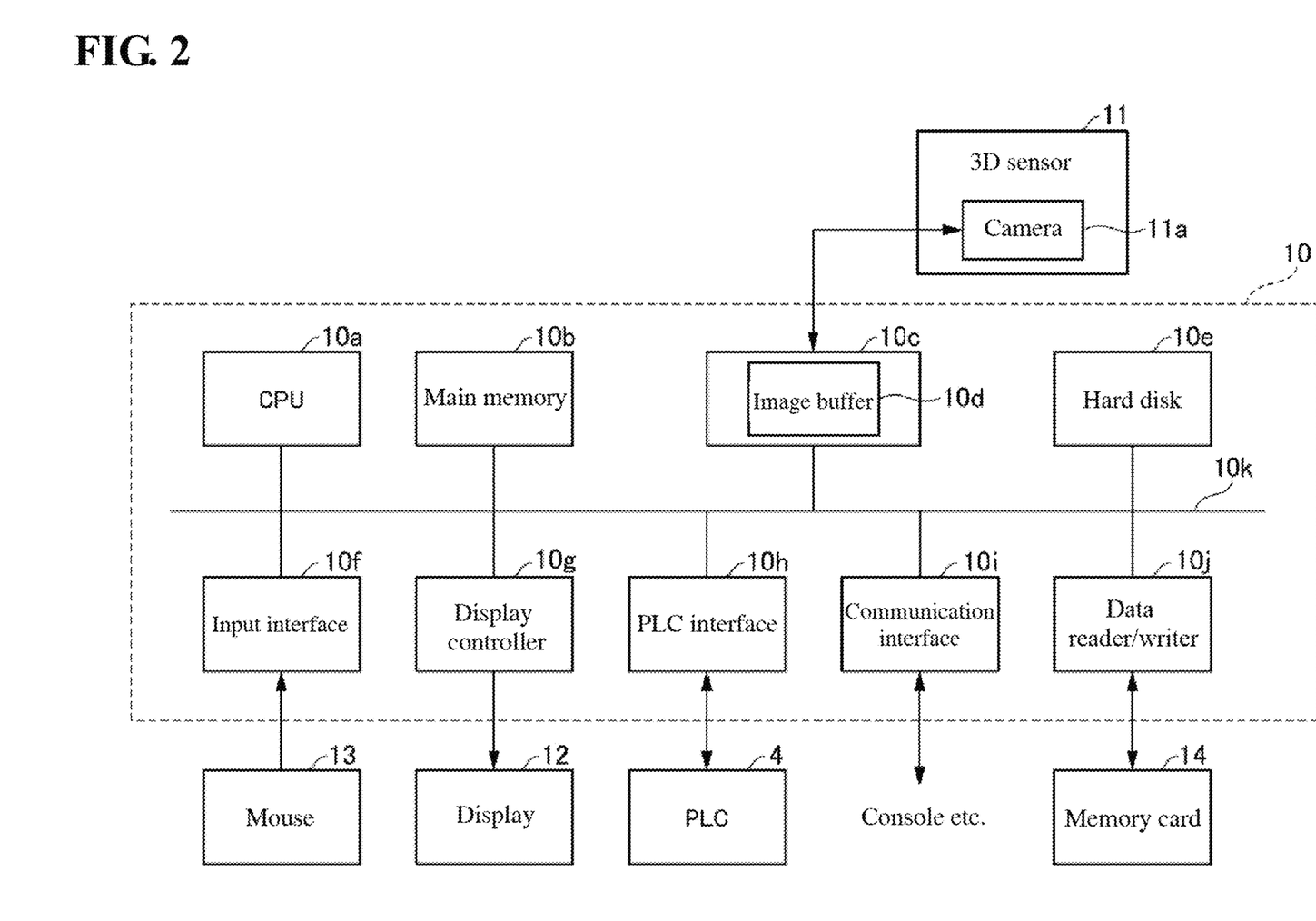
FIG. 2 is a diagram illustrating the hardware configuration of an object recognition apparatus.

The hardware configuration of the object recognition apparatus 1 will be described with reference to FIG. 2. The object recognition apparatus 1 is constituted by a 3D sensor 11 and the image processing apparatus 10, in general.

The 3D sensor 11 is a sensor for measuring three dimensions of the workpiece 2, and includes the camera 11a. The camera 11a is an image capturing device for capturing a digital image of the workpiece 2 into the image processing apparatus 10, and a CMOS (Complementary Metal-Oxide-Semiconductor) camera or a CCD (Charge-Coupled Device) camera can be suitably used, for example. The input image may have any format with regard to the resolution, color/monochrome, still image/moving image, gradation, and data format, and the format can be selected in accordance with types of workpiece 2 and the purpose of sensing as appropriate. If a special image other than a visible light image, such as and X-ray image or a thermo-image, is utilized to recognize or examine an object, then a camera corresponding to this image may also be used.

The image processing apparatus 10 includes a CPU (central processing unit) 10a, a main memory 10b used as a working memory, a hard disk 10e that is a fixed storage unit, a camera interface 10c, an input interface 10f, a display controller 10g, a PLC interface 10h, a communication interface 10i, and a data reader/writer 10j. These units are connected to each other so as to be capable of data communication via a bus 10k.

The camera interface 10c mediates data transmission between the CPU 10a and the camera 11a, and may also have an image buffer 10d for temporarily accumulating image data from the camera 11a. The input interface 10f mediates data transmission between the CPU 10a and the input unit. The input unit may also include a mouse 13, a keyboard, a touch panel, and a jog controller, for example. The display controller 10g is connected to the display 12 such as a liquid crystal monitor, and controls display on this display 12. The PLC interface 10h mediates data transmission between the CPU 10a and the PLC4. The communication interface 10i mediates data transmission between the CPU 10a and a console, or between a personal computer and a server, for example. The data reader/writer 10j mediates data transmission between the CPU 10a and the memory card 14 that is a recording medium.

The image processing apparatus 10 can be constituted by a computer having a general-purpose architecture, and various processes are executed by the CPU 10a reading a program stored in the hard disk 10e or the memory card 14. Such a program may be distributed in a state in which the program is stored in a computer-readable recording medium such as the memory card 14 or an optical disk, or may be provided through the Internet. Note that the program according to an embodiment may be provided as a single application program, or may be provided as a module that is incorporated in a part of another program. Part or all of the processes executed by this program may also be executed by a dedicated circuit such as an ASIC.

A-3. Configuration of Image Processing Apparatus

Figure 3:
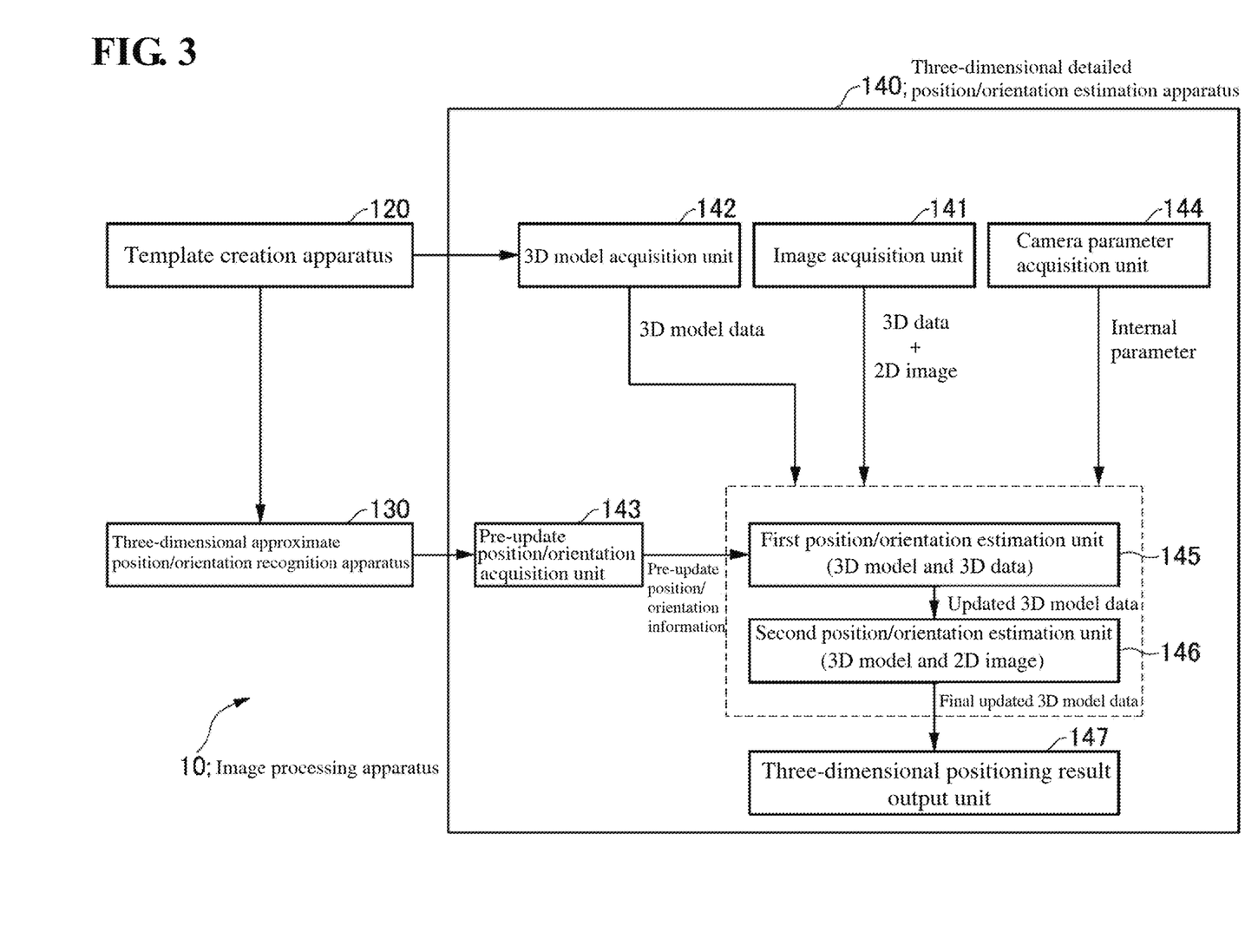
FIG. 3 is a diagram illustrating the configuration of an image processing apparatus.

FIG. 3 shows the configuration of the image processing apparatus 10. The image processing apparatus 10 operates as a template creation apparatus 120, a three-dimensional approximate position/orientation recognition apparatus 130, and a three-dimensional detailed position/orientation estimation apparatus 140 by the CPU 10a reading and executing a program stored in the hard disk 10e or the like.

Template Creation Apparatus 120

The template creation apparatus 120 creates a template showing characteristics of the contour of the workpiece 2 and characteristics of an internal unevenness shape of the workpiece 2. Specifically, the template creation apparatus 120 generates 2D images of the workpiece 2 viewed from various view points, using a 3D CAD representation of the workpiece 2 or 3D data acquired from the 3D sensor 11. Then, the template creation apparatus 120 creates a plurality of templates based on the generated luminance images and range images. The template creation apparatus 120 supplies the created templates, as template information, to the three-dimensional approximate position/orientation recognition apparatus 130 and the three-dimensional detailed position/orientation estimation apparatus 140. Note that the template (that is, a 3D model) may have any format, and the template can have an array format in which feature quantities of a plurality of feature points in the image are written, for example. A pixel value (luminance), a luminance gradient direction, a quantization gradient direction, a Hog (Histograms of Oriented Gradients), HAAR-Like, SIFT (Scale-Invariant Feature Transform) can be used as the feature points, and a normal direction and a normal direction distribution can be used as the feature quantity utilizing the range image, for example.

Three-Dimensional Approximate Position/Orientation Recognition Apparatus 130

The three-dimensional approximate position/orientation recognition apparatus 130 performs template matching on the 2D image and the 3D data captured from the camera 11a of the 3D sensor 11 using the template information supplied from the template creation apparatus 120, and recognizes the position/orientation of the three-dimensional object (that is, the workpiece 2) in the image. Specifically, the three-dimensional approximate position/orientation recognition apparatus 130 first captures the image obtained by inputting the workpiece 2, from the 3D sensor 11, and creates a set of images with different resolutions (that is, an image pyramid) from the captured input image (original image). The three-dimensional approximate position/orientation recognition apparatus 130 extracts the feature quantities of the image obtained by inputting the workpiece 2 by performing feature extraction on the created image pyramid. Herein, the feature quantities to be extracted are features that are the same type as those of the template, and an example of the feature quantities is a pixel value. The three-dimensional approximate position/orientation recognition apparatus 130 performs template matching using the extracted feature quantities of the image obtained by inputting the workpiece 2 and the template information of the workpiece 2 supplied from the template creation apparatus 120. The three-dimensional approximate position/orientation recognition apparatus 130 recognizes the rough position/orientation of the 3D model through template matching, and supplies the recognition result to the three-dimensional detailed position/orientation estimation apparatus 140 as pre-update position/orientation information expressing the position/orientation before the 3D model is updated.

Three-Dimensional Detailed Position/Orientation Estimation Apparatus 140

The three-dimensional detailed position/orientation estimation apparatus 140 estimates the three-dimensional position/orientation of the workpiece 2 utilizing the template information supplied from the template creation apparatus 120 and the pre-update position/orientation information supplied from the three-dimensional approximate position/orientation recognition apparatus 130. The three-dimensional detailed position/orientation estimation apparatus 140 includes an image acquisition unit 141, a 3D model acquisition unit 142, a pre-update position/orientation acquisition unit 143, a camera parameter acquisition unit 144, a first position/orientation estimation unit 145, a second position/orientation estimation unit 146, and a three-dimensional positioning result output unit 147.

The three-dimensional detailed position/orientation estimation apparatus 140 estimates the three-dimensional position/orientation using the 3D data in the first position/orientation estimation unit 145, and estimates the three-dimensional position/orientation using the 2D image in the second position/orientation estimation unit 146. Herein, the second position/orientation estimation unit 146 has the feature that only three parameters, namely translations X and Y and rotation θ, that can be estimated with high accuracy using the 2D image are optimized based on the result of the three-dimensional position/orientation estimation using the 3D data in the first position/orientation estimation unit 145 (details will be described later). Hereinafter, each unit will be described.

The image acquisition unit (the first and fourth acquisition units) 141 acquires 3D data (three-dimensional coordinate data) and the 2D image of the workpiece 2 from the 3D sensor 11. The image acquisition unit 141 outputs the acquired 3D data to the first position/orientation estimation unit 145, and outputs the acquired 2D image to the second position/orientation estimation unit 146.

When acquiring the template information expressing the 3D model from the template creation apparatus 120, the 3D model acquisition unit (second acquisition unit) 142 outputs, as the 3D model data, the acquired template information to the first position/orientation estimation unit 145 and the second position/orientation estimation unit 146.

The pre-update position/orientation acquisition unit (the third acquisition unit) 143 acquires pre-update position/orientation information expressing the rough position/orientation of the 3D model recognized by the three-dimensional approximate position/orientation recognition apparatus 130, and outputs the acquired pre-update position/orientation information to the first position/orientation estimation unit 145. Note that the pre-update position/orientation information is expressed by six parameters (x, y, z, $\varphi$, $\gamma$, $\theta$) including three translation parameters (x, y, z) and three rotation parameters ($\varphi$, $\gamma$, $\theta$) about the X-axis, the Y-axis, and the Z-axis.

The camera parameter acquisition unit 144 acquires, from the main memory 112, for example, internal parameters of the camera 11a utilized when the 3D sensor 11 generates the 3D data and the 2D image of the workpiece 2, and outputs the acquired internal parameters to the first position/orientation estimation unit 145 and the second position/orientation estimation unit 146. Examples of the internal parameter include a focal length of the camera 11a and the central position of the camera 11a.

The first position/orientation estimation unit 145 matches the positions of a 3D point group of the 3D model data and a 3D point group of the 3D data (referred to as "first positioning" hereinafter, details will be described later) utilizing the pre-update position/orientation information supplied from the pre-update position/orientation acquisition unit 143, the 3D model data supplied from the 3D model acquisition unit 142, and the 3D data supplied from the image acquisition unit 141 together with the internal parameters of the camera 11a that is supplied from the camera parameter acquisition unit 144. Although it is assumed that an ICP (Iterative Closest Point) algorithm is utilized as a technique for positioning 3D point groups in the first positioning in an embodiment, another technique may also be used. The first position/orientation estimation unit 145 updates the position/orientation of the 3D model through first positioning, and outputs the updated 3D model data (first position/orientation information) expressing the position/orientation of the updated 3D model to the second position/orientation estimation unit 146.

The second position/orientation estimation unit 146 adjusts the positions with respect to the translations x and y that define the 2D image plane and rotation $\theta$ (referred to as "second positioning", details will be described later) utilizing the updated 3D model data supplied from the first position/orientation estimation unit 145 and the 2D image supplied from the image acquisition unit 141 together with the internal parameters of the camera 11a that are supplied from the camera parameter acquisition unit 144. The second position/orientation estimation unit 146 finally updates the position/orientation of the 3D model through second positioning. Then, the second position/orientation estimation unit 146 outputs, to a three-dimensional positioning result output unit 147, the final updated 3D model data (second position/orientation information) expressing the position/orientation of the 3D model that was finally updated.

The three-dimensional positioning result output unit (output unit) 147 outputs the final updated 3D model data supplied from the second position/orientation estimation unit 146 to an external apparatus or a liquid crystal panel, for example. The final updated 3D model data is utilized to examine and measure a workpiece, position and assemble a workpiece, and control a picking robot, for example.

A-4. First Positioning

Figure 4:
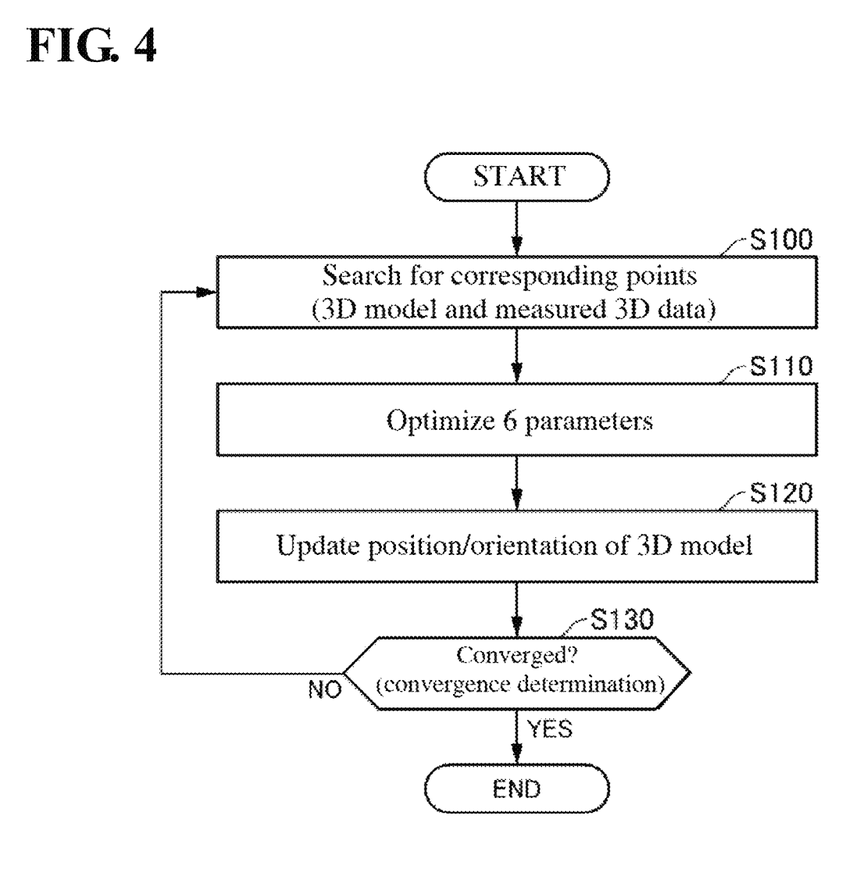
FIG. 4 is a flowchart illustrating first positioning.

Hereinafter, first positioning executed by the first position/orientation estimation unit 145 will be described. FIG. 4 is a flowchart showing the first positioning.

The first position/orientation estimation unit 145 searches for corresponding points using the 3D model data and the 3D data (step S100). Corresponding point search means processing in which, in a 3D space, with regard to each point (that is, 3D coordinates) of the 3D model, its closest point (that is, 3D coordinates) of the 3D data is searched for. Although first and second methods below are known as representative corresponding point search methods, the second method has a search range that is narrower than that of the first method and enables high-speed processing, and thus the second method is adopted in an embodiment.

First Method

The first method directly searches for, in a 3D space, points of the 3D data that are respectively closest to points of the 3D model.

Second Method

The points of the 3D model and the points of the 3D data are projected onto the same 2D image plane using the internal parameters of the camera 11a, and the points of the 3D data that are closest to the points of the 3D model are searched for, from the points of the 3D data that are located near the points of the 3D model projected on the 2D image plane.

The first position/orientation estimation unit 145 calculates errors between pairs of the points of the 3D model and the points of the 3D data (also referred to as "corresponding point pairs" hereinafter) that were obtained in the above-described corresponding point search, using an error metric (for quantifying differences), such as a "distance between points" or a "distance between a point and a surface". The first position/orientation estimation unit 145 determines the differences ($\Delta x$, $\Delta y$, $\Delta z$, $\Delta \varphi$, $\Delta \gamma$, and $\Delta \theta$) between the six parameters for bringing the points of the 3D model closer to their corresponding points of the 3D data so as to minimize a target function (error function). The first position/orientation estimation unit 145 then obtains optimized six parameters (x+$\Delta x$, y+$\Delta y$, z+$\Delta z$, $\varphi$+$\Delta \varphi$, $\gamma$+$\Delta \gamma$, $\theta$+$\Delta \theta$) by updating the six parameters using the obtained differences ($\Delta x$, $\Delta y$, $\Delta z$, $\Delta \varphi$, $\Delta \gamma$, $\Delta \theta$) between the six parameters (step S110).

The first position/orientation estimation unit 145 updates the pre-update position/orientation of the 3D model using the optimized six parameters (step S120). That is, the first position/orientation estimation unit 145 obtains the pre-update position/orientation of the 3D model based on the pre-update position/orientation information received from the pre-update position/orientation acquisition unit 143, and updates the obtained pre-update position/orientation of the 3D model using the optimized six parameters.

When updating the pre-update position/orientation of the 3D model, the first position/orientation estimation unit 145 determines whether or not positioning was performed in a state in which the 3D model was sufficiently close to the 3D data (also referred to as "convergence determination" hereinafter) (step S130). One example of a convergence determination method is a method in which the first position/orientation estimation unit 145 compares the previous position/orientation Pose(n−1) of a 3D point group of the 3D model with the current position/orientation Pose(n), obtains a position/orientation update width Lup, and checks whether or not the obtained position/orientation update width Lup is below a set convergence threshold Dth. If the obtained position/orientation update width Lup is below the set convergence threshold Dth, the first position/orientation estimation unit 145 determines that positioning was performed in a state in which the 3D point group of the 3D model was sufficiently close to the point group of the 3D data, and if the obtained position/orientation update width Lup exceeds the set convergence threshold Dth, then it determines that the 3D point group of the 3D model is not yet sufficiently close to the point group of the 3D data.

When the first position/orientation estimation unit 145 determines that the 3D point group of the 3D model is not yet sufficiently close to the 3D point group of the 3D data (step S130: NO), processing returns to step S100, and the first position/orientation estimation unit 145 repeatedly executes the series of processes of steps S100, S110 and S130 in this order.

On the other hand, when the first position/orientation estimation unit 145 determines that positioning was performed in a state in which the 3D point group of the 3D model was sufficiently close to the 3D point group of the 3D data (step S130: YES), then the first position/orientation estimation unit 145 outputs the updated 3D model data expressing the position/orientation of the updated 3D model to the second position/orientation estimation unit 146, and ends the first positioning described above.

Note that even if the series of processes of steps S100, S110, S120, and S130 is executed in this order a predetermined number of times, the position/orientation updated width Lup will sometimes not fall below the convergence threshold Dth. In order to handle such a case, an upper limit number of times N (N>1) may be set for the number of repetitions of the series of processes of steps S100, S110, S120, and S130 in this order, for example, and if the number of repetitions of the series of processes reaches the upper limit number of times N, then the first positioning may also be forcibly ended.

A-5. Second Positioning

Figure 5:
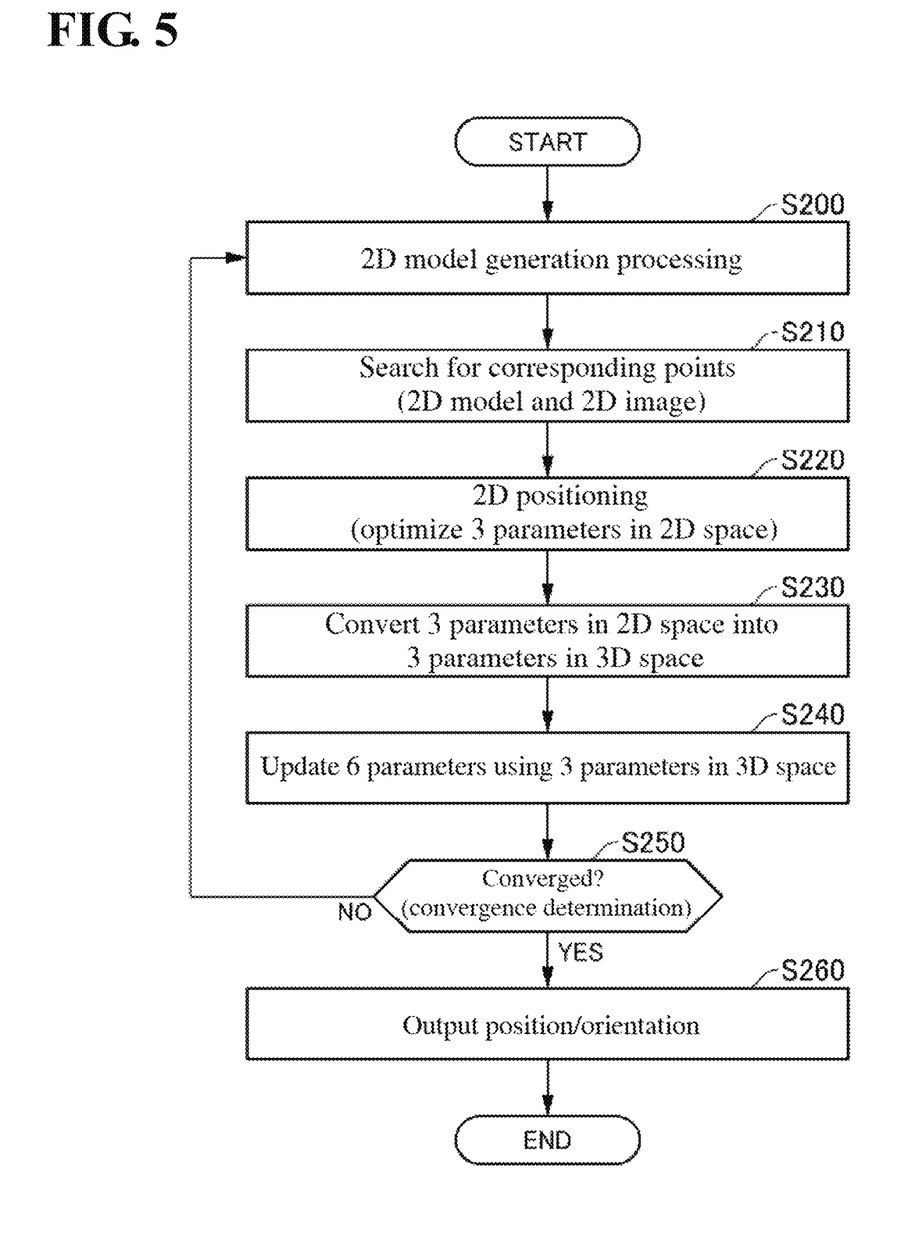
FIG. 5 is a flowchart illustrating second positioning.

Hereinafter, second positioning executed by the second position/orientation estimation unit 146 will be described. FIG. 5 is a flowchart showing second positioning.

The second position/orientation estimation unit (two-dimensional model generation unit) 146 projects the 3D model onto a 2D image plane using the position/orientation of the 3D model positioned by the first position/orientation estimation unit 145, the 3D model data, and the internal parameters of the camera 11a, for example, calculates a gradient feature quantity of the contour of the 2D image, and thereby generates a 2D model (step S200). Although the 2D model is generated online during measurement in an embodiment, it is also possible to generate a 2D model through offline processing in which 3D templates are created. If the 2D models were generated through offline processing in advance in this manner, the 2D model whose orientation is the closest to the current orientation is selected from among the plurality of 2D models that were already generated, and positioning (will be described later) is performed using the selected 2D model (will be described later).

When generating the 2D model, the second position/orientation estimation unit 146 searches for corresponding points using the 2D model data and the 2D data (step S210). Specifically, the second position/orientation estimation unit 146 calculates gradient features of the 2D image using a method similar to the method for generating the 2D model. The second position/orientation estimation unit 146 then derives, as the corresponding points, pixels (that is, gradient features of the 2D image) on the 2D image corresponding to the gradient features of the 2D model.

The second position/orientation estimation unit (optimization unit) 146 optimizes three parameters, namely translations x and y (unit: pixel) and rotation θ, on the 2D image by matching the positions of the 2D image and the 2D model on the 2D image plane based on the corresponding points on the 2D image (step S220). The second position/orientation estimation unit 146 converts the three parameters (translations x and y (unit: pixel), rotation θ) in the 2D space that were optimized using the 2D image into three parameters (translations x and y (unit: mm), rotation θ) in the 3D space (step S230). Specifically, because 3D coordinates (mm) of the 3D model corresponding to the 2D coordinates (pixel) of the 2D model can be calculated during the generation of the 2D model described above, the second position/orientation estimation unit 146 converts the position/orientation in the 2D space into the position/orientation in the 3D space by solving a PnP problem using a correspondence relationship between the "2D coordinates obtained by updating the position/orientation of the 2D model using the optimized three parameters in the 2D space" and the "3D coordinates of the 3D model" and the internal parameters of the camera 11a (step S230).

The second position/orientation estimation unit (updating unit) 146 further updates the position/orientation of the 3D model that was updated by the first position/orientation estimation unit 145 (also referred to as "the updated position/orientation of the 3D model" hereinafter) using the converted three parameters (translations x and y (unit: mm), rotation θ) in the 3D space (step S240). That is, the second position/orientation estimation unit 146 first obtains the position/orientation of the 3D model based on the updated 3D model data received from the first position/orientation estimation unit 145. The second position/orientation estimation unit 146 then further updates the updated position/orientation of the 3D model using the converted three parameters (translations x and y (unit: mm), rotation θ) in the 3D space. Thereafter, the second position/orientation estimation unit 146 performs convergence determination using a method that is similar to that for convergence determination performed by the first position/orientation estimation unit 145 shown in step S130 (step S250).

If the second position/orientation estimation unit 146 determines that the 3D point group of the 3D model is not yet sufficiently close to the 3D point group of the 3D data because the position/orientation update width Lup exceeds the convergence threshold Dth (step S250: NO), processing returns to step S200, and the second position/orientation estimation unit 146 repeatedly executes the series of processes of steps S200, S210, S220, S230, S240, and S250 in this order.

On the other hand, if the second position/orientation estimation unit 146 determines that the 3D point group of the 3D model is sufficiently close to the 3D point group of the 3D data because the position/orientation update width Lup is below the convergence threshold Dth in the convergence determination (step S250: YES), then the second position/orientation estimation unit 146 outputs the final updated 3D model data expressing the position/orientation of the 3D model that was finally updated, to the three-dimensional positioning result output unit 147 (step S260), and ends second positioning described above. Note that in step S260, the second position/orientation estimation unit 146 may also output, to the three-dimensional positioning result output unit 147, as the optimal parameter information, the six parameters of the position/orientation derived in step S240 in order to obtain the position/orientation of the final updated 3D model together with the final updated 3D model data.

A-6. Comparative Example

Figure 6:
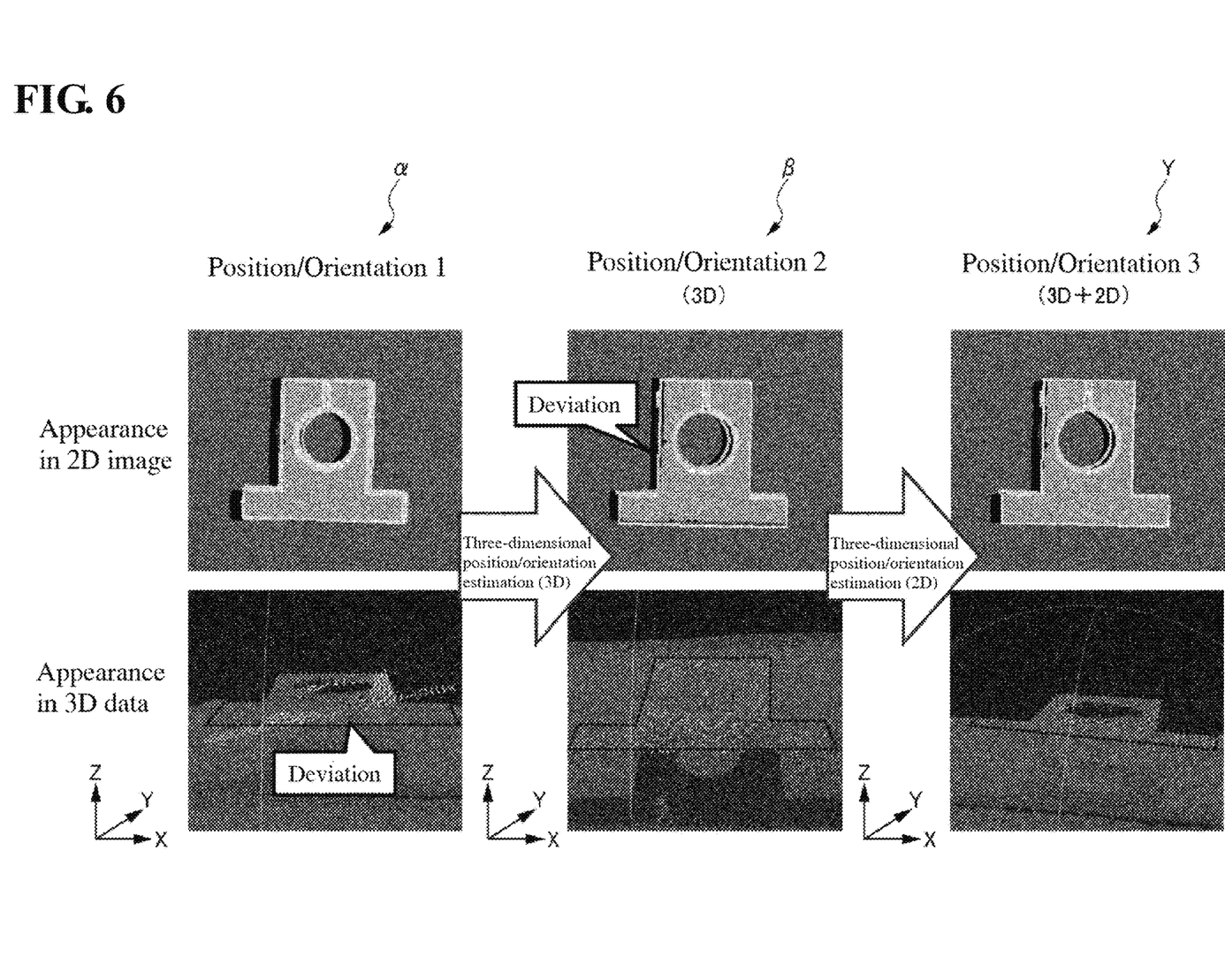
FIG. 6 is a diagram illustrating the position and the orientation of a workpiece.

FIG. 6 is a diagram showing the position/orientation of a workpiece, where α represents position/orientation 1 of a workpiece recognized by the three-dimensional approximate position/orientation recognition apparatus 130, ε represents position/orientation 2 of the workpiece if three-dimensional position/orientation estimation (3D) is performed using 3D data based on the position/orientation 1, and γ represents position/orientation 3 of the workpiece if three-dimensional position/orientation estimation (3D+2D) is further performed using a 2D image based on the position/orientation 2.

The position/orientation of the workpiece recognized by the three-dimensional approximate position/orientation recognition apparatus 130 is correct in the X-direction and the Y-direction, but deviates in the Z-direction (see the position/orientation 1 shown in FIG. 6a).

If three-dimensional position/orientation estimation is performed using only the 3D data based on the position/orientation 1, the estimated position/orientation is correct in the Z-direction, but deviates in the X-direction and the Y-direction (see the position/orientation 2 shown in FIG. 6β).

It is found that, in this regard, if three-dimensional position/orientation estimation is further performed using the 2D image based on the position/orientation 2 after the three-dimensional position/orientation estimation is performed using the 3D data, the position/orientation can be detected with high accuracy without deviating in any of the X-direction, the Y-direction, and the Z-direction (see the position/orientation 3 shown in FIG. 6γ).

As described above, according to an embodiment, the first position/orientation estimation unit 145 optimizes the six parameters (that is, translations x, y, and z and rotations φ, γ, and θ) using the 3D data, and the second position/orientation estimation unit 146 optimizes only the three parameters (that is, translations x and y, and rotation θ) that can be estimated using the 2D image with high accuracy based on the result of three-dimensional position/orientation estimation performed by the first position/orientation estimation unit 145 using the 3D data. Optimizing only the three parameters, namely translations x and y, and rotation θ, that can be estimated with high accuracy using the 2D image in this manner makes it possible to prevent the problem that the three parameters, namely the position (translation z) in the camera's depth direction and rotations (rotations φ and γ), cannot be estimated with high accuracy, which is a weakness of three-dimensional position/orientation estimation using a 2D image, and to estimate the three-dimensional position with a higher accuracy, compared with a conventional three-dimensional position/orientation estimation method with which the 3D data and the information of the 2D image are combined into one equation and the six parameters are optimized.

Also, it is possible to speed up optimization, compared with the above-described conventional three-dimensional position/orientation estimation method. That is, with the conventional method, it is necessary to combine 3D data and information of the 2D image into one formula and solve a complicated nonlinear optimization problem, whereas in an embodiment, two linear optimization problems should be solved, that is, six parameters should be optimized using 3D data and three parameters should be optimized using a 2D image, and thus it is not necessary to solve a complicated nonlinear optimization problem, and its processing can be sped up.

B. Modification

The above-described embodiment is a merely example for illustrating the present invention, and various modifications can be made to the present invention without departing from the gist thereof.

For example, various combinations of three-dimensional position/orientation estimation using 3D data ("3D estimation" hereinafter) and three-dimensional position estimation using a 2D image ("2D estimation" hereinafter) are conceivable. Although the mode for performing 2D estimation after 3D estimation was described in an embodiment, 3D estimation may also be performed after 2D estimation, or 3D estimation and 2D estimation may also be performed in parallel. For example, a configuration may also be adopted in which, if 3D estimation is performed after 2D estimation, the first position/orientation estimation unit 145 receives the position/orientation information updated by the second position/orientation estimation unit 146, and the position/orientation information updated by the first position/orientation estimation unit 145 is output to the three-dimensional positioning result output unit 147. On the other hand, a configuration may also be adopted in which, if 3D estimation and 2D estimation are performed in parallel, the position/orientation information acquired by the pre-update position/orientation acquisition unit 143 is supplied to the first position/orientation estimation unit 145 and the second position/orientation estimation unit 146, the position/orientation information that is updated by the first position/orientation estimation unit 145 and the position/orientation information that is updated by the second position/orientation estimation unit 146 are supplied to the three-dimensional positioning result output unit 147, and the three-dimensional positioning result output unit 147 outputs the position/orientation of an object based on the position/orientation information updated by the first position/orientation estimation unit 145 and the position/orientation information updated by the second position/orientation estimation unit 146.

Although the six parameters (translations x, y, and z, and rotations φ, γ, and θ) are optimized in 3D estimation in an embodiment, it is not intended to limit the invention to only this embodiment. For example, because the three parameters, namely translations x and y and rotation θ, are optimized in 2D estimation, the remaining three parameters (that is, translation z and rotations φ and γ) may also be optimized in 3D estimation. Specifically, the first position/orientation estimation unit 145 may also optimize the three parameters (that is, translation z and rotations φ and γ) for bringing the points of the 3D model closer to their corresponding points of the 3D data so as to minimize a target function (error function).

C. Other Considerations

In this specification, "unit" does not simply mean a physical configuration but also includes the case where processing executed by the "unit" is realized by software. Also, processing performed by one "unit" or one apparatus may also be executed by two or more physical configurations or apparatuses, or processing realized by two or more "units" or two or more apparatuses may also be executed by one physical means or apparatus.

The order of the processing steps described in this specification may be suitably changed or the processing steps may be executed in parallel, as long as no contradiction arises in the processing content.

Programs that implement the processes described in this specification may be stored in a recording medium. Use of this recording medium allows the above-described programs to be installed in the apparatuses constituting the image processing apparatus 10. Herein, the recording medium storing the above-described program may also be a non-transitory recording medium. The non-transitory recording medium is not particularly limited, and may be a recording medium such as a CD-ROM, for example.

Additional Remark 1

A position/orientation estimation apparatus configured to estimate a position and an orientation of an object, the apparatus including:

a first acquisition unit (141) configured to acquire a two-dimensional image of the object;

a second acquisition unit (142) configured to acquire a three-dimensional model expressing a three-dimensional shape of the object;

a third acquisition unit (143) configured to acquire position/orientation information expressing pre-update position and orientation of the object that are estimated;

a second position/orientation estimation unit (146) configured to update the position/orientation information with regard to a translation in an X-axis and a translation in a Y-axis, which are two different axes on a plane of the two-dimensional image, and a rotation about a Z-axis that is orthogonal to the X-axis and the Y-axis, using the three-dimensional model and the two-dimensional image; and an output unit (147) configured to output the position and the orientation expressed by the updated position/orientation information as the position and the orientation of the object.

Additional Remark 2

The position/orientation estimation apparatus according to Additional Remark 1, in which the second position/orientation estimation unit (146) includes a two-dimensional model generation unit (step S200) configured to generate a two-dimensional model projected on the same plane as that of the two-dimensional image, based on the position/orientation information, an optimization unit (step S220) configured to optimize a translation parameter in the X-axis, a translation parameter in the Y-axis, and a rotation parameter about the Z-axis by matching the positions of the two-dimensional image and the two-dimensional model; and an updating unit (step S240) configured to update the position/orientation information using the optimized three parameters.

Additional Remark 3

The position/orientation estimation apparatus according to Additional Remark 1 or 2, further comprising:

a fourth acquisition unit (141) configured to acquire three-dimensional coordinate data expressing three-dimensional coordinates of a surface of the object that have been measured; and a first position/orientation estimation unit (145) configured to update the position/orientation information through positioning using the three-dimensional model and the three-dimensional coordinate data, in which the first position/orientation estimation unit receives the position/orientation information acquired by the third acquisition unit, and the position/orientation information updated by the first position/orientation estimation unit is transmitted to the second position/orientation estimation unit.

Additional Remark 4

The position/orientation estimation apparatus according to Additional Remark 1 or 2, further comprising:

a fourth acquisition unit (141) configured to acquire three-dimensional coordinate data expressing three-dimensional coordinates of a surface of the object that have been measured; and a first position/orientation estimation unit (145) configured to update the position/orientation information through positioning using the three-dimensional model and the three-dimensional coordinate data, in which the first position/orientation estimation unit receives the position/orientation information updated by the second position/orientation estimation unit, and the position/orientation information updated by the first position/orientation estimation unit is transmitted to the output unit.

Additional Remark 5

The position/orientation estimation apparatus according to Additional Remark 1 or 2, further comprising:

a fourth acquisition unit (141) configured to acquire three-dimensional coordinate data expressing three-dimensional coordinates of a surface of the object that have been measured; and a first position/orientation estimation unit (145) configured to update the position/orientation information through positioning using the three-dimensional model and the three-dimensional coordinate data, in which the position/orientation information acquired by the third acquisition unit is transmitted to the first and second position/orientation estimation units, and the position/orientation information that is updated by the first position/orientation estimation unit and the position/orientation information that is updated by the second position/orientation estimation unit are transmitted to the output unit, and the output unit outputs the position and the orientation of the object based on the position/orientation information that is updated by the first position/orientation estimation unit and the position/orientation information that is updated by the second position/orientation estimation unit.

Additional Remark 6

The position/orientation estimation apparatus according to any one of Additional Remarks 3 to 5, in which, when performing positioning, the first position/orientation estimation unit (145) optimizes a translation parameter in the X-axis, a translation parameter in the Y-axis, a translation parameter in the Z-axis, a rotation parameter about the X-axis, a rotation parameter about the Y-axis, and a rotation parameter about the Z-axis so as to bring points of the three-dimensional model corresponding to points of the three-dimensional coordinate data closer to the corresponding points of the three-dimensional coordinate data, and updates the position/orientation information using the optimized six parameters.

Additional Remark 7

The position/orientation estimation apparatus according to any one of Additional Remarks 3 to 5, in which, when performing positioning, the first position/orientation estimation unit (145) optimizes a translation parameter in the Z-axis, a rotation parameter about the X-axis, and a rotation parameter about the Y-axis so as to bring points of the three-dimensional model corresponding to points of the three-dimensional coordinate data closer to the corresponding points of the three-dimensional coordinate data, and updates the position/orientation information using the optimized three parameters.

The invention claimed is:

1. A position/orientation estimation apparatus configured to estimate a position and an orientation of an object, the position/orientation estimation apparatus comprising:
a processor configured with a program to perform operations comprising:
operation as an image acquisition unit configured to acquire a two-dimensional image of the object;
operation as a 3D model acquisition unit configured to acquire a three-dimensional model expressing a three-dimensional shape of the object; and
operation as a pre-update position/orientation acquisition unit configured to acquire position/orientation information expressing a pre-update position and orientation of the object, which is estimated;
operation as a second position/orientation estimation unit configured to update the position/orientation information with regard to a translation in an X-axis and a translation in a Y-axis of the two-dimensional image, and a rotation about a Z-axis that is orthogonal to the X-axis and the Y-axis, using the three-dimensional model and the two-dimensional image; and
operation as an output unit configured to output the position and the orientation expressed by the updated position/orientation information as the position and the orientation of the object, wherein
the processor is configured with the program such that operation as the second position/orientation estimation unit comprises:
operation as a two-dimensional model generation unit configured to generate a two-dimensional model projected on a same plane as that of the two-dimensional image, based on the position/orientation information;
operation as an optimization unit configured to optimize a translation parameter in the X-axis, a translation parameter in the Y-axis, and a rotation parameter about the Z-axis by matching the positions of the two-dimensional image and the two-dimensional model; and
operation as an updating unit configured to update the position/orientation information using the optimized three parameters.

2. The position/orientation estimation apparatus according to claim 1, wherein the processor is configured with the program to perform operations such that operation as the first position/orientation estimation unit comprises:
receiving the position/orientation information acquired by the pre-update position/orientation acquisition unit; and
transmitting the position/orientation information updated by the first position/orientation estimation unit to the second position/orientation estimation unit.

3. The position/orientation estimation apparatus according to claim 2,
wherein the processor is configured with the program to perform operations such that operation as the first position/orientation estimation unit comprises optimizing the translation parameter in the X-axis, the translation parameter in the Y-axis, the translation parameter in the Z-axis, a rotation parameter about the X-axis, a rotation parameter about the Y-axis, and a rotation parameter about the Z-axis so as to bring points of the three-dimensional model corresponding to points of the three-dimensional coordinate data closer to the corresponding points of the three-dimensional coordinate data, and updates the position/orientation information using the optimized six parameters.

4. The position/orientation estimation apparatus according to claim 2,
wherein the processor is configured with the program to perform operation such that operation as the first position/orientation estimation unit comprises optimizing the translation parameter in the Z-axis, a rotation parameter about the X-axis, and a rotation parameter about the Y-axis so as to bring points of the three-dimensional model corresponding to points of the three-dimensional coordinate data closer to the corresponding points of the three-dimensional coordinate data, and updates the position/orientation information using the optimized three parameters.

5. The position/orientation estimation apparatus according to claim 1, wherein
the processor is configured with the program to perform operations such that operation as the first position/orientation estimation unit comprises:
receiving the position/orientation information updated by the second position/orientation estimation unit; and
transmitting the position/orientation information updated by the first position/orientation estimation unit to the output unit.

6. The position/orientation estimation apparatus according to claim 5,
wherein the processor is configured with the program to perform operation such that operation as the first position/orientation estimation unit comprises optimizing the translation parameter in the X-axis, the translation parameter in the Y-axis, the translation parameter in the Z-axis, a rotation parameter about the X-axis, a rotation parameter about the Y-axis, and a rotation parameter about the Z-axis so as to bring points of the three-dimensional model corresponding to points of the three-dimensional coordinate data closer to the corresponding points of the three-dimensional coordinate data, and updates the position/orientation information using the optimized six parameters.

7. The position/orientation estimation apparatus according to claim 5,
wherein the processor is configured with the program to perform operation such that operation as the first position/orientation estimation unit comprises optimizing the translation parameter in the Z-axis, a rotation parameter about the X-axis, and a rotation parameter about the Y-axis so as to bring points of the three-dimensional model corresponding to points of the three-dimensional coordinate data closer to the corresponding points of the three-dimensional coordinate data, and updates the position/orientation information using the optimized three parameters.

8. The position/orientation estimation apparatus according to claim 1, wherein the processor is configured with the program such that:
the position/orientation information acquired by the pre-update position/orientation acquisition unit is transmitted to the first position/orientation estimation unit and the second position/orientation estimation unit;
the position/orientation information that is updated by the first position/orientation estimation unit and the position/orientation information that is updated by the second position/orientation estimation unit are transmitted to the output unit;
operation as the output unit comprises outputting the position and the orientation of the object based on the position/orientation information that is updated by the first position/orientation estimation unit and the position/orientation information that is updated by the second position/orientation estimation unit.

9. The position/orientation estimation apparatus according to claim 8,
wherein the processor is configured with the program to perform operation such that operation as the first position/orientation estimation unit comprises optimizing the translation parameter in the X-axis, the translation parameter in the Y-axis, the translation parameter in the Z-axis, a rotation parameter about the X-axis, a rotation parameter about the Y-axis, and a rotation parameter about the Z-axis so as to bring points of the three-dimensional model corresponding to points of the three-dimensional coordinate data closer to the corresponding points of the three-dimensional coordinate data, and updates the position/orientation information using the optimized six parameters.

10. The position/orientation estimation apparatus according to claim 8,
wherein the processor is configured with the program to perform operation such that operation as the first position/orientation estimation unit comprises optimizing the translation parameter in the Z-axis, a rotation parameter about the X-axis, and a rotation parameter about the Y-axis so as to bring points of the three-dimensional model corresponding to points of the three-dimensional coordinate data closer to the corresponding points of the three-dimensional coordinate data, and updates the position/orientation information using the optimized three parameters.

11. A method for estimating a position and an orientation of an object, the method comprising:
acquiring a two-dimensional image of the object;
acquiring three-dimensional data expressing measured three-dimensional coordinates of a surface of the object;
acquiring a three-dimensional model expressing a three-dimensional shape of the object; and
acquiring position/orientation information expressing a pre-update position and orientation of the object, which is estimated;
updating the position/orientation information based on the three-dimensional model and the three-dimensional data;
updating the position/orientation information with regard to a translation in an X-axis and a translation in a Y-axis of the two-dimensional image, and a rotation about a Z-axis that is orthogonal to the X-axis and the Y-axis, using the three-dimensional model and the two-dimensional image;
outputting the position and the orientation expressed by the updated position/orientation information as the position and the orientation of the object;
generating a two-dimensional model projected on a same plane as that of the two-dimensional image, based on the position/orientation information;
optimizing a translation parameter in the X-axis, a translation parameter in the Y-axis, and a rotation parameter about the Z-axis by matching the positions of the two-dimensional image and the two-dimensional model; and
updating the position/orientation information using the optimized three parameters.

12. The method according to claim 11, wherein
updating the position/orientation information based on the three-dimensional model occurs prior to updating the position/orientation information with regard to the translation in the X-axis, the translation in the Y-axis, and the rotation about the Z-axis.

13. The method according to claim 11, wherein
updating the position/orientation information based on the three-dimensional model occurs after updating the position/orientation information with regard to the translation in the X-axis, the translation in the Y-axis, and the rotation about the Z-axis.

14. A non-transitory computer-readable storage medium storing a program for causing a computer to estimate a position and an orientation of an object, the program, when read and executed, causing the computer to perform operations comprising:
acquiring a two-dimensional image of the object;
acquiring three-dimensional data expressing measured three-dimensional coordinates of a surface of the object;
acquiring a three-dimensional model expressing a three-dimensional shape of the object;
acquiring position/orientation information expressing pre-update position and orientation of the object, which is estimated;
updating the position/orientation information based on the three-dimensional model and the three-dimensional data;
updating the position/orientation information with regard to a translation in an X-axis and a translation in a Y-axis of the two-dimensional image, and a rotation about a Z-axis that is orthogonal to the X-axis and the Y-axis, using the three-dimensional model and the two-dimensional image;
outputting the position and the orientation expressed by the updated position/orientation information as the position and the orientation of the object;
generating a two-dimensional model projected on a same plane as that of the two-dimensional image, based on the position/orientation information;
optimizing a translation parameter in the X-axis, a translation parameter in the Y-axis, and a rotation parameter about the Z-axis by matching the positions of the two-dimensional image and the two-dimensional model; and updating the position/orientation information using the optimized three parameters.

* * * * *